US012305387B2

(12) United States Patent
Jeon et al.

(10) Patent No.: US 12,305,387 B2
(45) Date of Patent: May 20, 2025

(54) SOUND ABSORBING DEVICE

(71) Applicant: KOREA ADVANCED INSTITUTE OF SCIENCE AND TECHNOLOGY, Daejeon (KR)

(72) Inventors: Wonju Jeon, Daejeon (KR); Hyeonbin Ryoo, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 150 days.

(21) Appl. No.: 18/014,373

(22) PCT Filed: Sep. 17, 2021

(86) PCT No.: PCT/KR2021/012882
§ 371 (c)(1),
(2) Date: Jan. 4, 2023

(87) PCT Pub. No.: WO2022/060188
PCT Pub. Date: Mar. 24, 2022

(65) Prior Publication Data
US 2023/0257992 A1 Aug. 17, 2023

(30) Foreign Application Priority Data
Sep. 21, 2020 (KR) ........................ 10-2020-0121367

(51) Int. Cl.
*E04B 1/86* (2006.01)
*G10K 11/172* (2006.01)

(52) U.S. Cl.
CPC .............. *E04B 1/86* (2013.01); *G10K 11/172* (2013.01); *G10K 2210/3214* (2013.01)

(58) Field of Classification Search
CPC . G10K 11/172; G10K 2210/3214; E04B 1/86
See application file for complete search history.

(56) References Cited

U.S. PATENT DOCUMENTS 8,678,130 B2 * 3/2014 Shiozawa ............ H04R 1/2873 181/175
11,854,523 B2 * 12/2023 Gomi ...................... E01B 19/00
(Continued)

FOREIGN PATENT DOCUMENTS

CN 109285534 1/2019
JP H05-333866 12/1993
(Continued)

OTHER PUBLICATIONS

EPO, Search Report of EP 21869810.8 dated Jul. 1, 2024.
(Continued)

*Primary Examiner* — Forrest M Phillips
(74) *Attorney, Agent, or Firm* — LEX IP MEISTER, PLLC

(57) ABSTRACT

A sound absorbing device according to an exemplary embodiment of the present invention comprises a plurality of sound absorbing cells arranged adjacent to each other on a plane, and each of the plurality of sound absorbing cells includes: a chamber having a volume therein, and in which a plurality of micro holes is perforated on a front surface in which a sound wave is incident; and a neck part introduced and extended to a rear of the front surface and penetrated by a through hole for communicating the outside and the chamber.

19 Claims, 9 Drawing Sheets

(56) References Cited

U.S. PATENT DOCUMENTS

| | | | | |
|---|---|---|---|---|
| 2005/0284690 A1* | 12/2005 | Proscia | ................ | G10K 11/172<br>181/210 |
| 2007/0034447 A1* | 2/2007 | Proscia | ................... | F02K 1/827<br>181/290 |
| 2017/0341186 A1* | 11/2017 | Hakuta | ................ | G10K 11/162 |
| 2020/0184942 A1* | 6/2020 | Hakuta | ................... | B32B 15/04 |
| 2022/0049657 A1* | 2/2022 | Riou | ........................ | B32B 3/266 |
| 2023/0349151 A1* | 11/2023 | Lee | ....................... | G10K 11/172 |

FOREIGN PATENT DOCUMENTS

| | | | | |
|---|---|---|---|---|
| JP | 2005-338795 | 12/2005 | | |
| JP | 2007-100394 | 4/2007 | | |
| JP | 2011-221283 | 11/2011 | | |
| JP | 2014-164237 | 9/2014 | | |
| JP | 2017-021152 | 1/2017 | | |
| KR | 10-2005-0110977 | 11/2005 | | |
| KR | 10-1112444 | 2/2012 | | |
| KR | 10-2019-0109893 | 9/2019 | | |
| KR | 10-2020-0030413 | 3/2020 | | |
| KR | 10-2116466 | 5/2020 | | |
| WO | WO-2019182213 A1 * | 9/2019 | ........... | G10K 11/172 |

OTHER PUBLICATIONS

Frank Simon, “Lang Elastic Open Neck Acoustic Resonator for low frequency absorption”, Journal of Sound and Vibration vol. 421, May 1, 2018, p. 1-16, XP093175843.

Wencheng Guo, “A compound micro-perforated panel sound absorber with partitioned cavities of different depths”, Energy Procedia, Elsevier, NL, vol. 78, 2015-12-30, p. 1617-1622, XP029375858.

KIPO, A Copy of PCT Search Report & Written Opinion of PCT/KR2021/012882 dated Dec. 8, 2021.

Li, Junfei et al. “A sound absorbing metasurface with coupled resonators” Applied Physics Letters 109.9 (Aug. 31, 2016): 091908.

Ryoo, Hyeonbin et al. “Perfect sound absorption of ultra-thin metasurface based on hybrid resonance and space-coiling” Applied Physics Letters 113.12 (Sep. 19, 2018): 121903.

Ma, Guancong et al. “Acoustic metasurface with hybrid resonances” Nature materials 13.9 (Jun. 1, 2014): 873-878.

Park, Soon-Hong, “Acoustic properties of micro-perforated panel absorbers backed by Helmholtz resonators for the improvement of low-frequency sound absorption.” Journal of Sound and Vibration 332.20 (May 22, 2013): 4895-4911.

* cited by examiner

SOUND ABSORBING DEVICE

TECHNICAL FIELD

The present invention relates to a sound absorbing device including a plurality of sound absorbing cells.

BACKGROUND ART

A device that efficiently reduces surrounding noise is an important consideration in daily life or industrial sites. A sound absorbing method used in a lot of industrial sites in order to reduce noise generated in various machinery facilities may be representatively divided into porous, resonance, and plate type sound absorbing methods according to a principle thereof.

The porous sound absorbing method is a method that adopts an appropriate material with high sound absorbing performance to enhance sound absorption coefficient at a specific frequency and a wideband frequency, and the resonance and plate type sound absorbing methods are methods that modify an internal structure of a sound absorbing material to partially enhance the sound absorption coefficient at the specific frequency.

Existing sound absorbing techniques have a clear limit that high sound absorption coefficient cannot be expected at a low frequency only with a small thickness of the sound absorbing material, and cannot show a wideband high sound absorbing effect in a low-frequency band.

Therefore, a sound absorbing technique suitable for low-frequency wideband sound absorption is required.

DISCLOSURE

Technical Problem

An aspect of the present invention has been made in an effort to provide a sound absorbing device showing a high sound absorbing effect in a low-frequency band.

Technical Solution

An exemplary embodiment of the present invention provides a sound absorbing device comprising a plurality of sound absorbing cells arranged adjacent to each other on a plane, wherein each of the plurality of sound absorbing cells includes: a chamber having a volume therein, and in which a plurality of micro holes is perforated on a front surface in which a sound wave is incident; and a neck part introduced and extended to a rear on the front surface and penetrated by a through hole for communicating the outside and the chamber.

A rear end of the neck part may be located in the chamber.

The neck part may be extended in a direction vertical to the front surface, and may have a cylinder shape in which the through hole penetrates a center.

When the sound wave passes through the neck part and the plurality of micro holes, a phase change occurs due to a visco-thermal effect, so a sound wave radiated through the neck part and a sound wave radiated through the plurality of micro holes at a target frequency may have opposite phases.

The chamber may have a pillar shape having the front surface as one bottom.

A thickness of the chamber which becomes a height of the pillar shape may be smaller than a wavelength of the sound wave.

The chamber may have a square pillar shape.

The front surfaces of the plurality of sound absorbing cells may be arranged vertical to a direction in which the sound wave is incident.

All of the plurality of sound absorbing cells may have the same size, and the front surfaces of the plurality of sound absorbing cells may form a plane.

Each of the plurality of sound absorbing cells may have the same volume of the chamber and the same extension length of the neck part.

Each of the plurality of sound absorbing cells may have a different size of the through hole from a sound absorbing cell at least adjacent to one side thereof.

Each of the plurality of sound absorbing cells may have a different number of micro holes from a sound absorbing cell at least adjacent to one side thereof.

The plurality of sound absorbing cells may include a first sound absorbing cell and a second sound absorbing cell different from the first sound absorbing cell in terms of the size of the through hole and the number of micro holes, and the first sound absorbing cell and the second sound absorbing cell may be alternately arranged.

Four sound absorbing cells are adjacent to each other and arranged in a grid form to form one sound absorbing unit, and a plurality of sound absorbing units may be arranged adjacent to each other on the plane.

Four sound absorbing cells may have a square pillar form having the same size, and have a different size of the through hole and a different number of micro holes between sound absorbing cells of which surfaces are in contact with each other.

The sound absorbing unit constituted by four sound absorbing cells may have two or more sound target frequencies.

Four sound absorbing cells may have a different size of the through hole and a different number of micro holes.

The sound absorbing unit constituted by four sound absorbing cells may have four or more sound target frequencies.

A diameter of the through hole and a diameter of each of the micro holes may be $1/90$ times less than the wavelength of the incident sound wave.

The number of micro holes may be 4 to 100.

On the front surface, a ratio of an area of one micro hole among the plurality of micro holes and an area of the through hole may be in the range of 1:1 to 1:36.

Advantageous Effects

According to an exemplary embodiment of the present invention, through a structure in which a HelmHoltz resonator and a micro perforated plate are combined, high sound absorption coefficient can be achieved in a low-frequency band.

Further, high sound absorption coefficient can be achieved for a plurality of frequencies in a low-frequency band, and a sound absorbing effect can be shown in a wideband.

MODE FOR INVENTION

Figure 1:
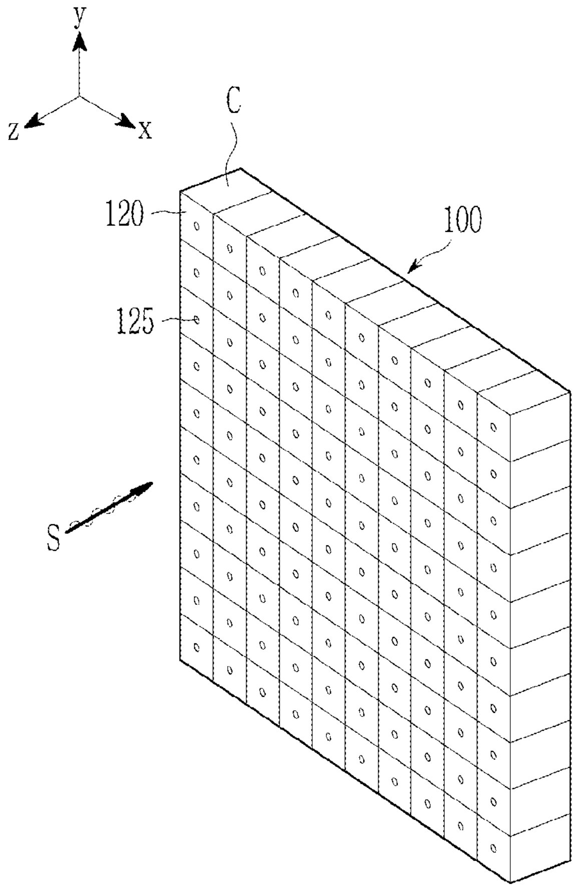
FIG. 1 is a perspective view of a sound absorbing device according to a first exemplary embodiment of the present invention.

Hereinafter, an exemplary embodiment of the present invention will be described in detail so as to be easily implemented by those skilled in the art, with reference to the accompanying drawings. However, the present invention can be realized in various different forms, and is not limited to the exemplary embodiments described below. In addition, in the present specification and drawings, the same component is denoted by the same reference numeral.

The drawings and description are to be regarded as illustrative in nature and not restrictive. Like reference numerals designate like elements throughout the specification.

In addition, each configuration illustrated in the drawings is arbitrarily shown for understanding and ease of description, but the present invention is not limited thereto.

Throughout this specification and the claims that follow, when it is described that an element is “coupled” to another element. In addition, unless explicitly described to the contrary, the word “comprise”, and variations such as “comprises” or “comprising”, will be understood to imply the inclusion of stated elements but not the exclusion of any other elements.

FIG. 1 is a perspective view of a sound absorbing device according to a first exemplary embodiment of the present invention.

Referring to FIG. 1, the sound absorbing device 100 according to the exemplary embodiment of the present invention may include a plurality of sound absorbing cells 120 arranged two dimensionally on a plane, and may be made in a panel form with a small thickness.

The plurality of sound absorbing cells 120 may be arranged in the form of a grid. For example, the plurality of sound absorbing cells 120 may be arranged in the form of the grid on the plane vertical to an incident sound wave S and a through hole 125 (see FIG. 2, etc.) of the sound absorbing cell 120 may be arranged toward the incident sound wave S, so that reflection coefficient may be 0 at a specific frequency of the incident sound wave S. For example, each sound absorbing cell 120 may have a structure of a Helmholtz resonator having a hole (neck) communicating with the outside in a container form having an inner space.

In FIG. 1, when the sound wave S is incident in a z-axis direction (parallel to a z axis), the plurality of sound absorbing cells 120 may be arranged in x and y-axis directions on an xy plane vertical to the incident sound wave S, and the through hole 125 of the sound absorbing cell 120 may have a form of being extended in line with the z axis which is in line with a direction in which the sound wave is incident.

The sound absorbing cell 120 constituting the sound absorbing device 100 may have a smaller scale (a subwavelength scale) than a wavelength of the sound wave S. That is, a length of one side of the sound absorbing cell 120, e.g., a thickness (a z-axis direction length, H, see FIG. 3) of the sound absorbing cell 120 may be smaller than the wavelength of the sound wave S. As a result, the sound absorbing device 100 has a small thickness to show a high sound absorbing effect in a small space. By using such a morphological advantage, a panel type sound absorbing device 100 having the small thickness is attached to a structure such as a wall to serve as a meta-surface.

All of the plurality of sound absorbing cells 120 constituting the sound absorbing device 100 may have the same size. In this case, front surfaces 130 of the plurality of sound absorbing cells 120 may be arranged vertical to the direction in which the sound wave is incident, and may form the plane.

In the present specification, ‘front’ means a front direction (a direction close to a sound source generating the sound wave) based on an incident direction of the sound wave, and ‘rear’ means a rear direction (a direction moving away from the sound source generating the sound wave) based on the incident direction of the sound wave.

Hereinafter, the structure of the sound absorbing cell 120 constituting the sound absorbing device 100 according to the exemplary embodiment of the present invention will be described in detail.

Figure 2:
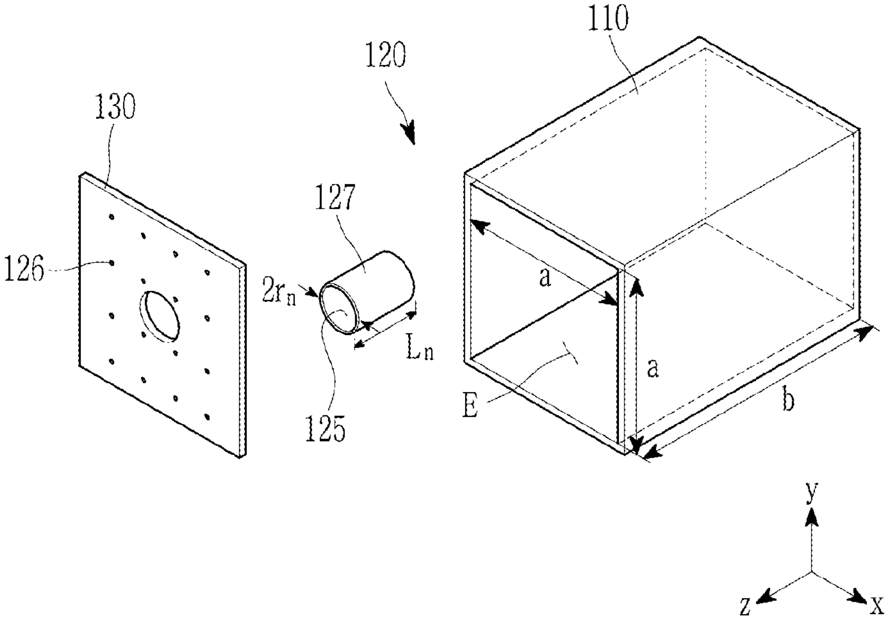
FIG. 2 is an exploded perspective view of a sound absorbing cell constituting the sound absorbing device of FIG. 1.
Figure 3:
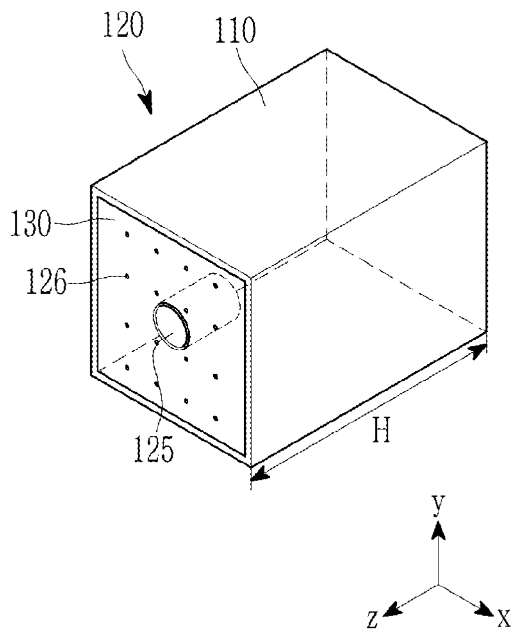
FIG. 3 is a perspective view of the sound absorbing cell constituting the sound absorbing device of FIG. 1.

FIG. 2 is an exploded perspective view of a sound absorbing cell constituting the sound absorbing device of FIG. 1 and FIG. 3 is a perspective view of the sound absorbing cell constituting the sound absorbing device of FIG. 1.

According to the exemplary embodiment of the present invention, the sound absorbing cell 120 may have a pillar shape having a front surface 130 in which the sound wave S is incident as one bottom. For example, the sound absorbing cell 120 may have a square pillar shape or a cuboid shape. As a result, as illustrated in FIG. 1, the sound absorbing device 100 may be formed by arranging one side surface of each of contiguous sound absorbing cells to be in contact with each other among the plurality of sound absorbing cells 120.

However, a form of the sound absorbing cell 120 is not limited to the cuboid shape, and may be an oblique pillar form.

The structure of the cuboid-shaped sound absorbing cell 120 is illustratively described with reference to FIGS. 2 and 3.

The sound absorbing cell 120 includes a chamber 110 having a volume (space E) therein and a neck part 127 having a predetermined length $L_n$, which is penetrated by a through hole 125 which makes the chamber be in communication with the outside.

The chamber 110 may have a form in which a plurality of micro holes 126 is perforated on the front surface 130 in which the sound wave is incident. For example, a plate in which the plurality of micro holes 126 having the same size is perforated seals an opened front of a box type structure of which front is opened to form the chamber 110. In this case, the plate (a plate constituting the front surface of the chamber) in which the plurality of micro holes 126 is perforated may have a thickness of 0.1 mm or more. The reason is that when the perforated plate has a thickness smaller than 0.1 mm, propagation of the sound wave is influenced by vibration of the plate itself. According to the exemplary embodiment of the present invention, the plate (the plate constituting the front surface of the chamber) in which the plurality of micro holes 126 is perforated may have a thickness of 2 mm. Since the thickness is a length of the micro hole 126 is extended in a progress direction of the sound wave, the thickness becomes a length of a path of sound wave through the micro hole. Hereinafter, the plate (the plate constituting the front surface of the chamber) in which the plurality of micro holes 126 is perforated has the thickness of 2 mm in FIGS. 4, 7, and 9.

The size of the micro hole 126 may be equal to or less than the size of the through hole 125. According to an exemplary embodiment, a ratio of an area of the micro hole 126 on the front surface 130 of the chamber 110 and an area of the through hole 125 may have a range of 1:1 to 1:36. For example, in order to show the high sound absorbing effect, when the through hole 125 has a diameter of 0.5 to 3 mm, the micro hole 126 may have a diameter of 0.5 mm. Meanwhile, the ratio of the area of the micro hole 126 and the through hole 125 may vary depending on the thickness of the plate (the plate constituting the front surface of the chamber) in which the plurality of micro holes 126 is perforated, and as the thickness of the plate (the plate constituting the front surface of the chamber) decreases, the ratio of the area of the micro hole 126 and the area of the through hole 125 may decrease. That is, as the thickness of the plate (the plate constituting the front surface of the chamber) decreases, a difference between the area of the micro hole 126 and the area of the through hole 125 may increase.

Further, the number of micro holes 126 may be a range of 4 to 100. As an experiment result, since an arrangement position or a spacing interval of the micro hole 126 on the front surface 130 of the chamber 110 does not affect the performance of the sound absorbing device of the present invention, a predetermined number of micro holes 126 may be arranged freely in a region so as not to encroach a central through hole 125 area on the front surface 130.

The neck part 127 may have a form of being introduced and extended toward the internal space E (i.e., to the rear of the front surface 130). As a result, the neck part 127 may have a form of being embedded toward the internal space E on the front surface 130 of the chamber 110. That is, the through hole 125 may penetrate along the neck part 127 on the front surface 130 of the chamber 110. For example, a cross section of the through hole 125 vertical to a penetration direction may be a circular form, and may have a diameter in the range of 0.5 to 3 mm.

The neck part 127 may have a circular cross section having a predetermined size, elongate so as to connect the outside and the internal space E of the sound absorbing cell 120, and have a predetermined diameter $2r_n$. That is, the neck part 127 may be connected to the rear of the front surface 130 so that the outside and the space E in which the sound wave is generated are in communication with each other through the through hole 125. The neck part 127 may be extended in a direction vertical to the front surface 130, and an end may be located in the chamber. That is, an extension length $L_n$ of the neck part 127 may be smaller than the length (z axis direction) of the internal space E of the chamber 110. For example, the neck part 127 may be extended in the direction vertical to the front surface 130 of the chamber 110, and have a cylinder shape in which the through hole 125 penetrates the center.

Since the chamber 110 may be constituted by an external wall having a predetermined thickness, the space E may have the cuboid shape to correspond to the shape of the chamber 110. For example, referring to FIG. 2, the space E may have the cuboid shape in which a width (x axis-direction length), a length (y axis-direction length), and a thickness (z axis-direction length) are a, a, and b, respectively. However, the shape of the space E is not limited to the cuboid shape, and may be various shapes having a predetermined volume. As described above, the thickness (e.g., the thickness of the sound absorbing cell, b) of the chamber 110 may be smaller than the wavelength of the sound wave.

According to the exemplary embodiment, in the sound absorbing cell 120, a cross section in a direction which is in line with the plane on which the plurality of sound absorbing cells is arranged may be a square. That is, the sound absorbing cell 120 may have a square pillar shape. For example, referring to FIG. 2, the sound absorbing cell may have a square bottom having a one-side length of a and a square pillar form having a height of b. As a result, when the sound absorbing device 100 is viewed from the front (when viewed in a −z axis direction) or when the sound absorbing device 100 is viewed from the rear (when viewed in a z axis direction), the sound absorbing device 100 may be formed in a grid form in which the square sound absorbing cells C are consecutively arranged.

In the case of describing a sound absorbing process in the sound absorbing cell 120, when the sound wave S which is incident toward the sound absorbing cell 120 is incident on the front surface 130 of the chamber 110, the sound wave S is propagated to the inside of the chamber through the neck part 127 and the micro holes 126. The sound wave S is propagated to the inside of the chamber, and then reflected on the wall surface forming the internal space E of the chamber, and radiated through the neck part 127 and the micro holes 126. In this case, since the diameters of the through hole 125 and the micro holes 126 of the neck part 127 are much smaller than the wavelength of the incident sound wave, a phase change occurs due to a very high visco-thermal dissipation when the sound wave passes through the neck part 127 and the micro hole 126. In this case, the sound absorbing cell 120 is configured so that a phase of the sound wave radiated through the neck part 127 and the phase of the sound wave radiated through the micro holes 126 are opposite at a target frequency. According to the exemplary embodiment of the present invention, the diameter of the through hole 125 and the diameter of the micro hole 126 may be 1/80 times less than the wavelength of the incident sound wave in order to show the very high visco-thermal dissipation so that the phase of the sound wave radiated through the neck part 127 and the phase of the sound wave radiated through the micro holes 126 are opposite. That is, in the sound absorbing device 100 according to the exemplary embodiment of the present invention, sound absorbing cells 120 in which the size (diameter) of the through hole 125 and the number of micro holes 126 are optimally determined (i.e., the phase of the sound wave radiated through the neck part 127 and the phase of the sound wave radiated through the micro holes 126 are made to be opposite at the target frequency) are arranged, and as a result, the sound wave radiated through the neck part 127 and the sound wave radiated through the micro holes 126 in each of the sound absorbing cells 120 are made to be trapped in the near-field region from the front surface of the sound absorbing cells 120 and simultaneously to induce destructive interference in the far-field region from the front surface of the sound absorbing cells 120 to achieve perfect sound absorption in which a reflective wave is 0.

Figure 4:
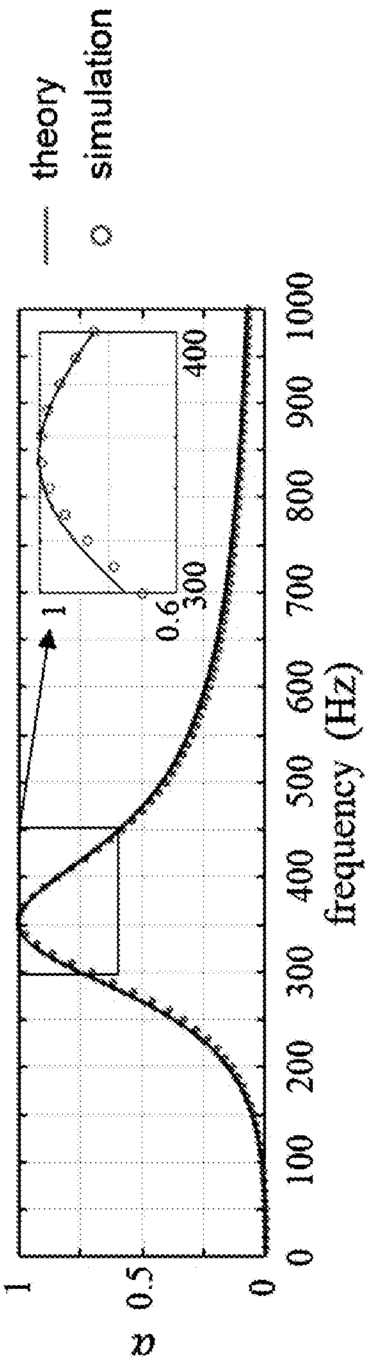
FIG. 4 is a graph showing a sound absorbing effect of a sound absorbing device according to a first exemplary embodiment of the present invention.

FIG. 4 is a graph showing a sound absorbing effect of a sound absorbing device according to a first exemplary embodiment of the present invention. In FIG. 4, the x axis represents the frequency and the y axis represents absorption rate.

In FIG. 4, when the size of the sound absorbing cell 120 is a=33 mm, b=47 mm, $L_n$=14 mm, and H=50 mm and the target frequency is 350 Hz, a radius of the through hole 125 is determined as $r_n$=2.75 mm and the number of micro holes 126 is determined as $m_n$=16 through an optimization algorithm, and a result of experimenting sound absorbing performance for the sound absorbing device 100 in which a plurality of sound absorbing cells 120 optimally designed are arranged is shown. In FIG. 4, both a theory value and a simulation experiment value are shown.

As for describing the optimization algorithm to determine the radius of the through hole 125 and the number of micro holes 126, a sequential quadratic programming (SQP) scheme is used so that a difference between effective acoustic impedance of the sound absorbing cell 120 at the front surface 130 calculated for the target frequency and acoustic impedance of external air is minimized, and an object function is set so that a reflection coefficient of the sound absorbing cell 120 is minimized.

Referring to FIG. 4, the sound may be completely absorbed at 350 Hz which is the target frequency, and in this case, the thickness H of the sound absorbing device 100 is 1/20 times of the wavelength of the incident sound wave base on the target frequency. Further, a frequency bandwidth capable of absorbing energy of 90% or more of the sound wave is 67 Hz, and it can be seen that a very wide frequency band may be absorbed at high sound absorption coefficient.

Meanwhile, the structure of the sound absorbing device 100 is modified to show high sound absorption coefficient for one or more specific frequencies and wideband frequencies, and hereinafter, a sound absorbing device according to a modified exemplary embodiment will be described. In the exemplary embodiment below, duplicated contents with the first exemplary embodiment are omitted and a difference is primarily described.

Figure 5:
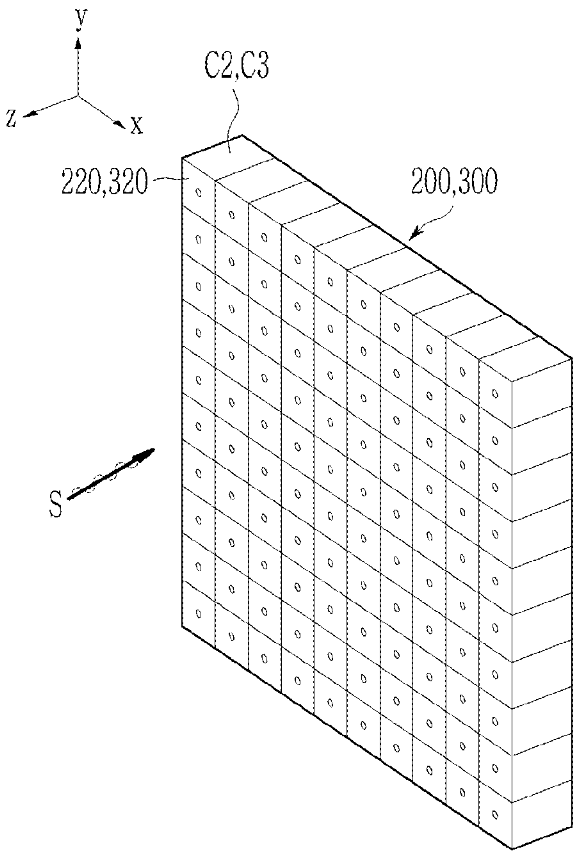
FIG. 5 is a perspective view of a sound absorbing device according to a second exemplary embodiment and a third exemplary embodiment of the present invention.

FIG. 5 is a perspective view of a sound absorbing device according to a second exemplary embodiment and a third exemplary embodiment of the present invention.

Referring to FIG. 5, sound absorbing devices 200 and 300 according to other exemplary embodiments of the present invention may be configured by arraying a plurality of sound absorbing units C2 and C3 on the plane. In this case, four sound absorbing cells 220 and 320 are arrayed to constitute one sound absorbing unit C2 or C3.

In this case, four sound absorbing cells 220 and 320 constituting the sound absorbing units C2 and C3 may be arrayed in the grid form, and may absorb a plurality of frequencies.

Figure 6:
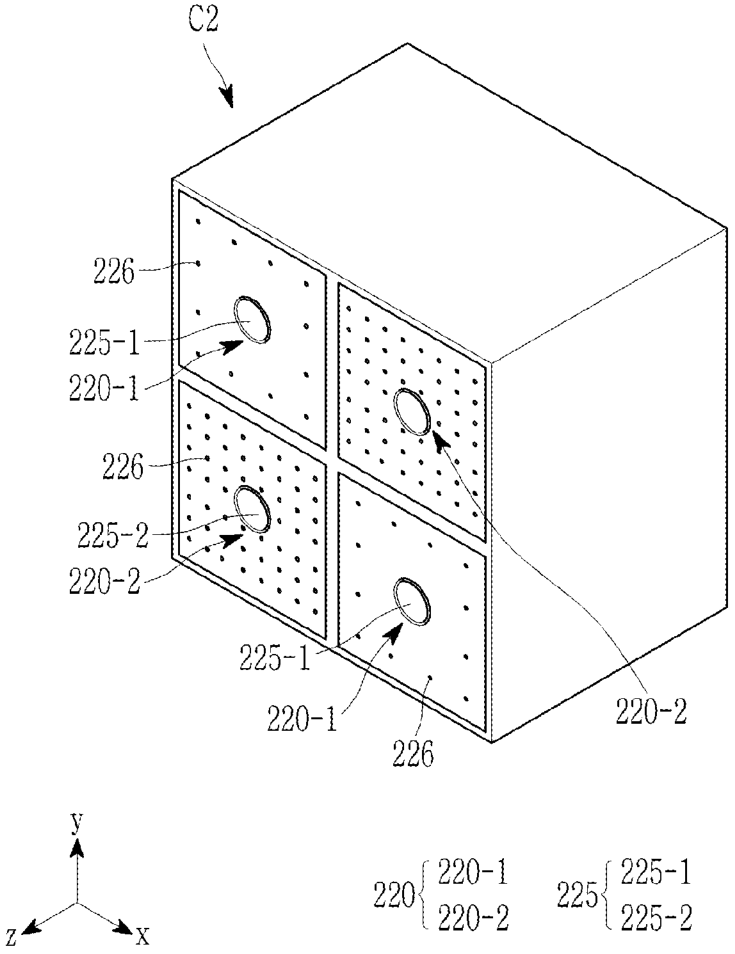
FIG. 6 is a perspective view of a sound absorbing unit constituting the sound absorbing device according to the second exemplary embodiment of the present invention.
Figure 7A:
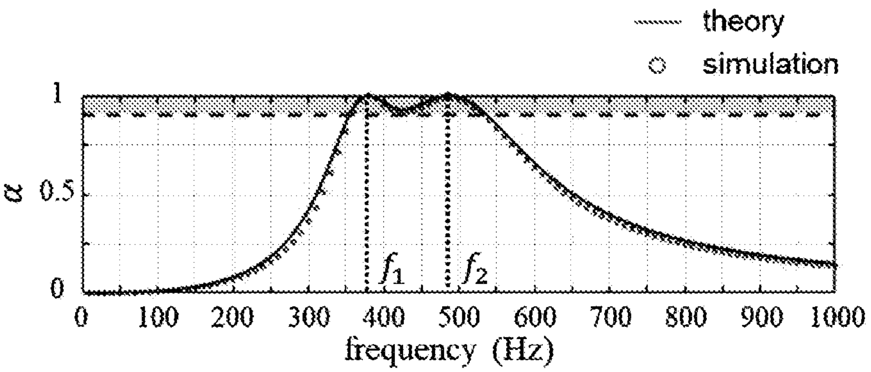
FIG. 7 is a graph showing a sound absorbing effect of the sound absorbing device according to the second exemplary embodiment of the present invention.
Figure 7B:
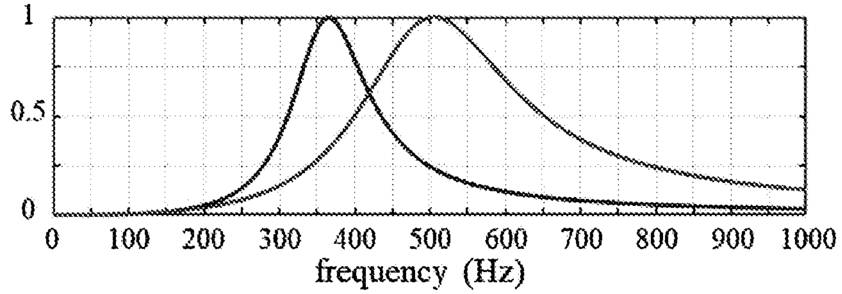

FIG. 6 is a perspective view of a sound absorbing unit constituting the sound absorbing device according to the second exemplary embodiment of the present invention and FIG. 7 is a graph showing a sound absorbing effect of the sound absorbing device according to the second exemplary embodiment of the present invention.

Referring to FIG. 6, in the sound absorbing unit C2 constituting the sound absorbing device 200 according to the second exemplary embodiment, sizes of through holes 225-1 and 225-2 and the number of micro holes 226 may be equal to each other between sound absorbing cells 220 disposed in a diagonal direction among four sound absorbing cells 220. That is, at least one of the size of the through hole 225 and the number of micro holes 226 may be different between sound absorbing cells 220 of which surfaces are in contact with each other (adjacent in the x axis or y axis direction). In other words, the sound absorbing unit C2 constituting the sound absorbing device 200 according to the second exemplary embodiment may be constituted by two types of sound absorbing cells 220. (i.e., in the radius of the through hole, $r_n$ and the number of micro holes, $m_n$, n=1, 2)

The sound absorbing device 200 in which the sound absorbing unit C2 constituted by two types of sound absorbing cells 220 is arrayed may absorb two frequencies.

For reference, in the case of the first exemplary embodiment described above, referring to FIG. 1, all of four sound absorbing cells 120 constituting the sound absorbing unit C are the same in the terms of the size of the through hole and the number of micro holes. That is, the sound absorbing unit C of the first exemplary embodiment may be constituted by one type of sound absorbing cell 120.

FIG. 7(*a*) illustrates an experimental result showing the sound absorption coefficient of the sound absorbing device 200 according to the second exemplary embodiment and FIG. 7(*b*) jointly shows respective sound absorption coefficients of two types of sound absorbing cells 220 constituting the sound absorbing device 200 of the second exemplary embodiment in one graph. FIG. 7(*a*) shows both a theory value (illustrated with a solid line) an experimental value (illustrated with dots) through a sample model jointly.

In FIG. 7(*a*), in four sound absorbing cells 220 constituting the sound absorbing unit C2, when a=33 mm, b=57 mm, $L_n$=10 mm, and H=60 mm and the target frequencies are 430 Hz and 515 Hz, the radius of the through hole 225 and the number of micro holes 226 of two types of sound absorbing cells are determined as $r_1$=3.8 mm, $m_1$=16, $r_2$=4.4 mm, and $m_2$=40 through the optimization algorithm. That is, in four sound absorbing cells 220, the volume of the chamber and the extension length of the neck part are the same, and the diameter of the through hole 225 and the number of micro holes 226 are different between two types of sound absorbing cells.

Referring to FIG. 7(*a*), the thickness H of the sound absorbing device 200 is 1/14.3 times of the wavelength of the incident sound wave based on the frequency of 430 Hz. A frequency bandwidth capable of absorbing energy of 90% or more of noise is 176 Hz. It can be seen that the sound may be absorbed in a frequency band twice or more wider than the sound absorbing device 100 of the first exemplary embodiment.

Further, when FIGS. 7(*a*) and 7(*b*) are compared, it can be seen that an interval between peak frequencies becomes narrower than the peak frequency of each sound absorbing cell due to an interaction between different types of (the numbers of through holes and micro holes are different) adjacent sound absorbing cells, and as a result, the high sound absorbing effect is shown in the wideband.

Figure 8:
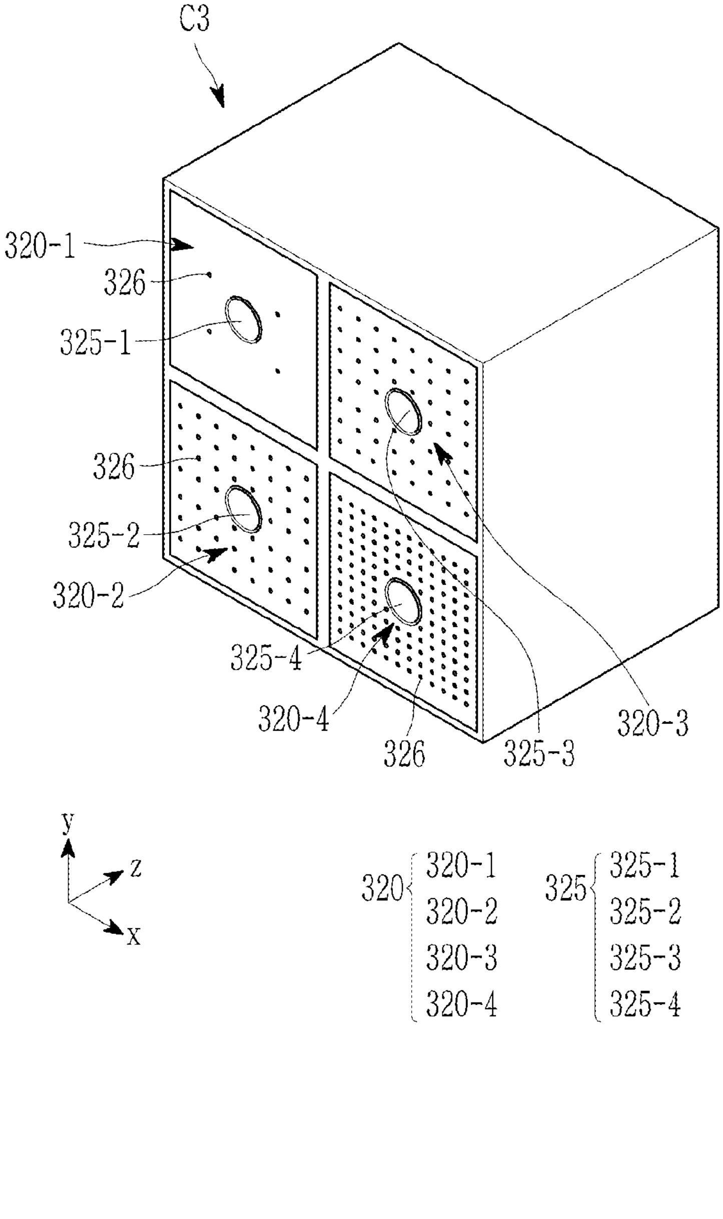
FIG. 8 is a perspective view of the sound absorbing unit constituting the sound absorbing device according to the third exemplary embodiment of the present invention.
Figure 9A:
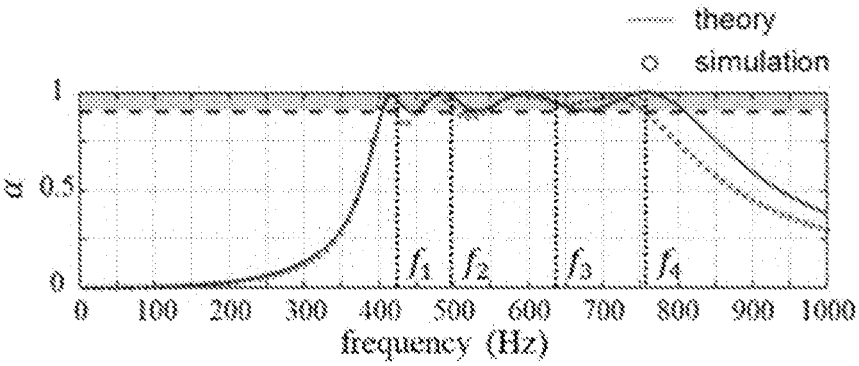
FIG. 9 is a graph showing the sound absorbing effect of the sound absorbing device according to the third exemplary embodiment of the present invention.
Figure 9B:
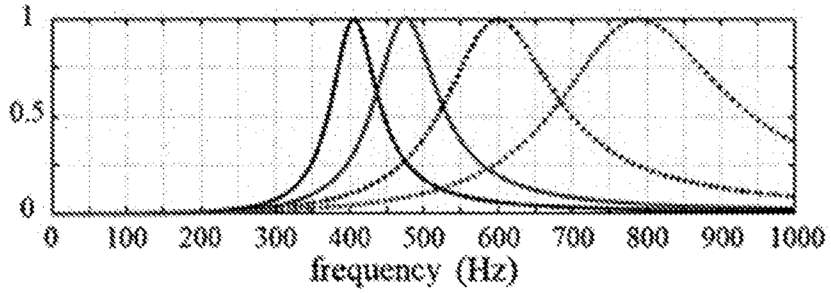

FIG. 8 is a perspective view of the sound absorbing unit constituting the sound absorbing device according to the third exemplary embodiment of the present invention and FIG. 9 is a graph showing the sound absorbing effect of the sound absorbing device according to the third exemplary embodiment of the present invention.

Referring to FIG. 8, in the sound absorbing unit C3 constituting the sound absorbing device 300 according to the third exemplary embodiment, sizes of through holes 325-1, 325-2, 325-3, and 325-4 and the number of micro holes 326 may be different from each other between four sound absorbing cells 320. In other words, the sound absorbing unit C3 constituting the sound absorbing device 300 of the third exemplary embodiment may be constituted by four types of sound absorbing cells 320. (i.e., in the radius of the through hole, $r_n$ and the number of micro holes, $m_n$, n=1, 2, 3, 4)

The sound absorbing device 200 in which the sound absorbing unit C3 constituted by four types of sound absorbing cells 320 is arrayed may absorb four frequencies.

FIG. 9(*a*) illustrates an experimental result showing the sound absorption coefficient of the sound absorbing device 300 according to the third exemplary embodiment and FIG. 9(*b*) jointly shows respective sound absorption coefficients of four types of sound absorbing cells 320 constituting the sound absorbing device 300 of the third exemplary embodiment in one graph. FIG. 9(*a*) shows both a theory value (illustrated with a solid line) an experimental value (illustrated with dots) through a sample model jointly.

In FIG. 9(*a*), in four sound absorbing cells 320 constituting the sound absorbing unit C3, when a=33 mm, b=57 mm, $L_n$=18 mm, and H=60 mm and the target frequencies are 480 Hz, 545 Hz, 620 Hz, and 710 Hz, the radius of the through hole 325 and the number of micro holes 326 of four types of sound absorbing cells are determined as $r_1$=5.9 mm, $m_1$=8, $r_2$=6.4 mm, $m_2$=16, $r_3$=7.4 mm, $m_3$=24, $r_4$=7.8 mm, and $m_4$=64 through the optimization algorithm. That is, in four sound absorbing cells 320, the volume of the chamber and the extension length of the neck part are the same, and all of the diameter of the through hole 325 and the number of micro holes 326 are different.

Referring to FIG. 9(*a*), the thickness H of the sound absorbing device 300 is 1/12 times of the wavelength of the incident sound wave based on the frequency of 480 Hz. A frequency bandwidth capable of absorbing energy of 90% or more of noise is 267 Hz. It can be seen that the sound may be absorbed in a frequency band wider than the sound absorbing device 200 of the second exemplary embodiment.

Further, when FIGS. 9(*a*) and 9(*b*) are compared, an interval between peak frequencies becomes narrower than the peak frequency of each sound absorbing cell due to an interaction between different types of (the numbers of through holes and micro holes are different) adjacent sound absorbing c.

As such, according to the exemplary embodiment of the present invention, through the sound absorbing cell having a structure in which the plate in which the micro hole is perforated coupled to the Helmholtz resonator form in which the through holes is formed in the chamber, high sound absorption coefficient may be provided in a low frequency band.

Further, at least one of the size of the through hole and the number of micro holes in the plurality of sound absorbing cells constituting the sound absorbing device is differently arrayed, and as a result, high sound absorption coefficient may be provided for a plurality of frequencies in the low frequency band, and the sound absorbing effect may be shown in the wideband.

Although the preferred exemplary embodiment of the present invention is described through the above description, but the present invention is not limited thereto and various modifications can be made within the claims and the range of the detailed description and the accompanying drawings of the invention, and this also belongs to the scope of the present invention, of course.

EXPLANATION OF REFERENCE NUMERALS

100, 200, 300 Sound absorbing device
110 Chamber
125, 225, 325 Through hole
126, 226, 326 Micro hole
127 Neck part
120, 220, 320 Sound absorbing cell

The invention claimed is:

1. A sound absorbing device comprising a plurality of sound absorbing cells arranged adjacent to each other on a plane, wherein,
each of the plurality of sound absorbing cells includes:
a chamber having a volume therein, and in which a plurality of micro holes is perforated on a front surface in which a sound wave is incident; and
a neck part introduced and extended to a rear of the front surface and penetrated by a through hole for communicating the outside and the chamber,
wherein:
when the sound wave passes through the neck part and the plurality of micro holes, a phase change occurs due to a visco-thermal effect, so a sound wave radiated through the neck part and a sound wave radiated through the plurality of micro holes at a target frequency have opposite phases.

2. The sound absorbing device of claim 1, wherein:
rear end of the neck part is located in the chamber.

3. The sound absorbing device of claim 2, wherein:
the neck part
is extended in a direction vertical to the front surface, and
has a cylinder shape in which the through hole penetrates a center.

4. The sound absorbing device of claim 1, wherein:
the chamber has a pillar shape having the front surface as one bottom.

5. The sound absorbing device of claim 4, wherein:
a thickness of the chamber which becomes a height of the pillar shape is smaller than a wavelength of the sound wave.

6. The sound absorbing device of claim 1, wherein:
the front surfaces of the plurality of sound absorbing cells are arranged vertical to a direction in which the sound wave is incident.

7. The sound absorbing device of claim 6, wherein:
all of the plurality of sound absorbing cells have the same size, and
the front surfaces of the plurality of sound absorbing cells form a plane.

8. The sound absorbing device of claim 1, wherein:
each of the plurality of sound absorbing cells
has the same volume of the chamber and the same extension length of the neck part.

9. The sound absorbing device of claim 1, wherein:
each of the plurality of sound absorbing cells
has a different size of the through hole from a sound absorbing cell at least adjacent to one side thereof.

10. The sound absorbing device of claim 1, wherein:
each of the plurality of sound absorbing cells
has a different number of micro holes from a sound absorbing cell at least adjacent to one side thereof.

11. The sound absorbing device of claim 1, wherein:
the plurality of sound absorbing cells includes a first sound absorbing cell and a second sound absorbing cell different from the first sound absorbing cell in terms of the size of the through hole and the number of micro holes, and
the first sound absorbing cell and the second sound absorbing cell are alternately arranged.

12. The sound absorbing device of claim 1, wherein:

four sound absorbing cells are adjacent to each other and arranged in a grid form to form one sound absorbing unit, and a plurality of sound absorbing units are arranged adjacent to each other on the plane.

13. The sound absorbing device of claim 12, wherein:

four sound absorbing cells have a square pillar form having the same size, and have a different size of the through hole and a different number of micro holes between sound absorbing cells of which surfaces are in contact with each other.

14. The sound absorbing device of claim 13, wherein:

the sound absorbing unit constituted by four sound absorbing cells has two or more sound target frequencies.

15. The sound absorbing device of claim 12, wherein:

four sound absorbing cells have a different size of the through hole and a different number of micro holes.

16. The sound absorbing device of claim 15, wherein:

the sound absorbing unit constituted by four sound absorbing cells has four or more sound target frequencies.

17. The sound absorbing device of claim 1, wherein:

a diameter of the through hole and a diameter of each of the micro holes are $\frac{1}{90}$ times less than the wavelength of the incident sound wave.

18. The sound absorbing device of claim 1, wherein:

the number of micro holes is 4 to 100.

19. The sound absorbing device of claim 1, wherein:

on the front surface, a ratio of an area of one micro hole among the plurality of micro holes and an area of the through hole is in the range of 1:1 to 1:36.

* * * * *